United States Patent [19]
Nordin

[11] Patent Number: 5,518,447
[45] Date of Patent: May 21, 1996

[54] DEVICE AT EXHAUST-GAS EXTRACTION HOSES

[75] Inventor: Kurt L. Nordin, Helsingborg, Sweden

[73] Assignee: AB Ph. Nederman & Co., Helsingborg, Sweden

[21] Appl. No.: 367,148

[22] PCT Filed: Jul. 8, 1993

[86] PCT No.: PCT/SE93/00621
§ 371 Date: Jan. 9, 1995
§ 102(e) Date: Jan. 9, 1995

[87] PCT Pub. No.: WO94/01230
PCT Pub. Date: Jan. 20, 1994

[30] Foreign Application Priority Data

Jul. 10, 1992 [SE] Sweden ................... 9202139

[51] Int. Cl.$^6$ .................................................. F23J 11/00
[52] U.S. Cl. .................................................. 454/63; 104/52
[58] Field of Search ................... 104/52; 454/63, 454/64

[56] References Cited

U.S. PATENT DOCUMENTS 3,492,937  2/1970  Ameli ................................. 454/63 X
5,162,017  11/1992  Nordin ................................. 454/63

FOREIGN PATENT DOCUMENTS 0459249  12/1991  European Pat. Off. .
9001928  9/1993  Sweden .

*Primary Examiner*—Harold Joyce
*Attorney, Agent, or Firm*—Tarolli, Sundheim, Covell, Tummino & Szabo

[57] ABSTRACT

A device at exhaust-gas extraction hoses for extracting the exhausts from the exhaust pipe on a vehicle, whereby the exhaust-gas extraction hose (1) is adapted to be retained at the vehicle (4) in an exhaust-gas extracting position (A), whereby the exhaust-gas extraction hose (1) includes a retaining device (8) which can be located on the vehicle (4) spaced apart from the exhaust pipe (3) and whereby an end portion (6) of the exhaust-gas extracting hose (1) includes and/or cooperates with a tightening device (7) which can by tightened by bending and/or stretching the end portion (6) in an exhaust-gas extracting position (A) when the retaining device (8) is attached to the vehicle (4). The tightening device (7) comprises at least one spring (10) which can be stretched in such a way that said spring, when the retaining device (8) is attached to the vehicle (4), affects the end portion (6) of the exhaust-gas extracting hose (1) in axial direction (B) or in substantially axial direction (B) such that the end portion (6), through a support (11) mounted thereon and/or through its end edge (12), is held with pressure against the end edge (13) of the exhaust pipe (3) and/or against vehicle part (14) situated adjacent the end edge (13) of the exhaust pipe (3).

12 Claims, 5 Drawing Sheets

DEVICE AT EXHAUST-GAS EXTRACTION HOSES

The present invention relates to a device at exhaust-gas extraction hoses for extracting the exhausts from the exhaust pipe on a vehicle, whereby the exhaust-gas extraction hose is mounted at the top in premises and a depending part thereof can be located relative to the exhaust pipe so that exhausts therefrom can be removed through the hose, whereby the exhaust-gas extraction hose is adapted to be retained in an exhaust-gas extracting position when the vehicle is driven in the premises, whereby the exhaust-gas extraction hose is automatically releasable from its exhaust-gas extracting position when the vehicle is driven out of the premises, whereby the exhaust-gas extraction hose includes a retaining device which can be located on the vehicle spaced apart from the exhaust pipe and whereby an end portion of the exhaust-gas extraction hose includes and/or cooperates with a tightening device which can be tightened by bending and/or stretching the end portion and which retains said end portion in fan exhaust-gas extracting position when the retaining device is attached to the vehicle.

A device of the above type is already known from our Swedish patent application 9001928-2. This prior art device can be used at most exhaust pipe embodiments and also at most locations of the exhaust pipes. In certain cases however, the exhaust pipes are designed and/or located in such manner that it will be difficult to locate the exhaust-gas extraction hose in a suitable way in relation thereto. Such cases are e.g. when the exhaust pipe has an unusual cross-sectional shape and/or is sensitive to side loads. The exhaust pipe can also be placed beside a part of the body of the vehicle so that the exhaust-gas extraction hose can not be located such that the exhausts are extracted with sufficient efficiency.

The object of the present invention is to eliminate the above problem and provide a simple device which permits the exhaust-gas extraction hose to be placed in suitable positions relative to the exhaust pipe even if the exhaust pipe has an unusual cross-sectional shape and/or is located close to parts of the body. This is arrived at according to the invention substantially while the initially defined device has received the characterizing features of claim 1.

Since the device according to the invention has a spring means with the function as defined in claim 1, it becomes possible to position the exhaust-gas extraction hose such that its support means engages the end edge of the exhaust pipe, whereby it is ensured that the exhaust pipe can be subjected neither to side loads nor to damages on its sides. Furthermore, the exhaust-gas extraction hose can be located such that it with its end edge with pressure engages a body part close to the exhaust pipe instead of engaging said exhaust pipe directly, which is advantageous if the exhaust pipe is mounted close to such a body part.

The invention will be further described below with reference to the accompanying drawings, wherein FIG. 1 with a side view and in section illustrates an exhaust-gas extraction hose forming part of the device according to the invention;

Figure 1:
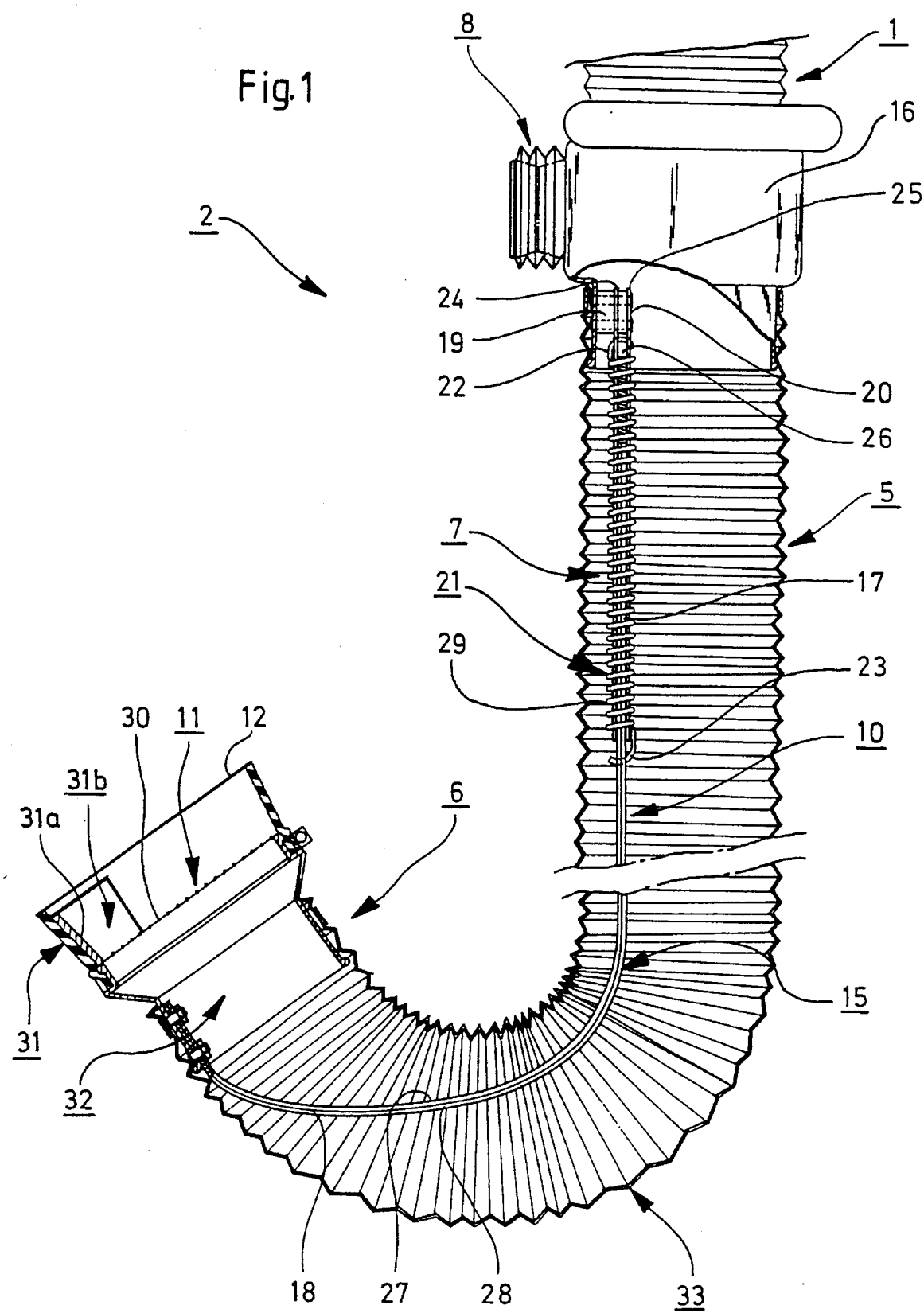

In the drawings there is shown an exhaust-gas extraction hose 1 which is mounted in premises 2, e.g. a fire station, for connection to a vehicle 4, e.g. a fire-fighting vehicle, such that exhausts from the exhaust pipe 3 of the vehicle 4 can be extracted from the premises 2 through the hose 1. The exhaust-gas extraction hose 1 is adapted to remain on the vehicle 4 when it is moved about in the premises 2 and to be automatically released from the vehicle when said vehicle approaches or reaches a gate on its way out of the premises. The exhausts from the vehicle are in this way effectively prevented from flowing out into the premises 2 and one need not think about disconnecting the hose 1 from the vehicle 4 when said vehicle leaves the premises 2.

For the suspension of the exhaust-gas extraction hose 1 in the premises, the hose preferably comprises a roof-mounted guide rail (not shown) which preferably starts at a gate end extends into the premises 2 and runs above those parts of the premises in which the vehicle 4 can be moved about.

The exhaust-gas extraction hose 1 is preferably suspended in the guide rail via crabs (not shown) end it is preferably connected to a fan device (not shown) which is adapted to generate a negative pressure in the hose 1 for extraction of the exhausts from the premises 2 through said hose. Before the exhausts are released into the atmosphere, they can preferably be cleaned in a filter aggregate (not shown).

The exhaust-gas extraction hose 1 includes a depending part 5 the end portion 6 of which can be located relative to the exhaust pipe 3 such that exhausts therefrom are sucked into the hose 1.

The depending part 5 of the hose 1 forms and/or cooperates with a tightening device 7 which can be tightened by bending and/or stretching the end portion 6. The tightening device 7 is adapted to retain the end portion 6 at the exhaust pipe 3 by being tightened when the hose 1 is attached to the vehicle 4 through a retaining device 8 when the end portion 6 is located in an exhaust-gas extracting position A relative to the exhaust pipe 3. The hose 1 is adapted to be connected by attaching the retaining device 8 in a suitable location on the vehicle 4 and then bend and/or stretch the end portion 6 until it can be located in its extracting position A relative to the exhaust pipe 3. During this bending and/or stretching of the end portion 6, the tightening device 7 is tightened and it can in tightened condition retain the end portion in its extracting position A. Alternatively, the end portion 6 can first be placed in its exhaust-gas extracting position A and then, the end portion 6 can be bent and/or stretched until the retaining device 8 can be attached to the vehicle 4. The tightening device 7 is tightened also at this bending and/or stretching of the end portion 6.

In untightened condition, the tightening device 7 preferably holds the end portion 6 in a bent and contracted condition and it can preferably be straightened out and/or extended to a greater length. In untightened condition, the end portion 6 can also be bent and contracted in upwards direction and it can be bent and/or stretched downwards.

The retaining device 8 preferably includes an electromagnet which is normally-operating for attachment to a vehicle 4 which is driven into the premises 2. The operation of the electromagnet is interrupted when the vehicle 4 is driven in a direction out of the premises 2 and occurs preferably when the exhaust pipe 3 of the vehicle 4 is outside the premises 2 or inside the premises adjacent the gate. The electromagnet preferably forms part of an electric circuit with a disconnecting device which in a suitable manner is connected to the exhaust-gas extraction hose 1 such that said disconnecting device moves along with the hose 1 when said hose is connected to a moving vehicle 4. The disconnecting device can e.g. be connected to a crab and it my include a movable disconnecting means which is brought to tip aside when the disconnecting device reaches a limit means during movement of the hose 1 when the vehicle 4 is driven towards the gate. Since the disconnecting means is tipped aside when it reaches the limit means, the current in the electric circuit is disconnected, whereby the electromagnet becomes currentless such that it disengages the vehicle 4. When the electromagnet disengages the vehicle 4, the hose 1 is also disengaged therefrom, whereby the vehicle 4 can continue driving out of the premises 2 without the hose 1 and the tightening device 7 can return to untightened position, whereby it bends and pulls the end portion 6 upwards.

On vehicles 4 permitting connection of the exhaust-gas extraction hose 1, there is preferably provided a fixing means 9 and this is provided at such distance from the exhaust pipe 3 that the tightening device 7 is tightened sufficiently when the electromagnet engages the fixing means 9 and holds on thereto by its magnetic force and when the hose 1 has been placed in extracting position A relative to the exhaust pipe 3.

The tightening device 7 includes at least one spring means 10 which can be stretched in such a way that it—when the retaining device 8 is fixed or attached to the vehicle 4—affects the end portion 6 of the hose 1 in axial direction B or in substantially axial direction B such that the end portion 6, through a support means 11 provided thereon and/or through its end edge 12, can be held with pressure against the end edge 13 of the exhaust pipe 3 and/or against vehicle parts 14 located adjacent said end edge 13 of said exhaust pipe 3.

The spring means 10 preferably includes at least one plate spring 15 which at the top is connected to a tubular member 16 forming part of the exhaust-gas extraction hose 1 and carrying the retaining device 8. Down below, the plate spring 15 is mounted on the end portion 6 and preferably on the underside thereof.

The plate spring 15 has an upper portion 17 which in inoperative normal shape is straight or substantially straight and in inoperative normal position directed vertically or substantially vertically. The upper portion 17 of the plate spring 15 transforms down below into a lower portion 18 which is arcuate or substantially arcuate and swung aside relative to the upper portion 17 in the same lateral direction as the retaining device 8 protrudes from the exhaust-gas extraction hose 1. The lower portion 18 of the spring 15 is further designed such that it in operative normal position preferably holds the end portion 6 in an upwardly inclined direction.

The upper end portion 20 of the plate spring 15 is through a bracket 19 directly or indirectly rigidly connected to the retaining device 8.

To permit height adjustment of the end portion 6, the lower portion 18 of the plate spring 15 is preferably telescopically movable in vertical direction or substantially vertical direction relative to the upper portion 17 of said spring. Hereby, the plate spring 15 can preferably be designed such that its upper and lower portions 17, 18 guide each other during the vertical relative movement, whereby it is ensured that this movement becomes linear. In order for the lower portion 18 of the plate spring 15 to automatically retracts said lower portion 18 to its untensioned vertical position after having been pulled down, said plate spring 15 includes a spring element 21 the upper end 22 of which is connected to the upper portion 17 of said plate spring 15 and the lower end 23 of which is connected to the lower portion 18 of said plate spring 15. The spring element 21 preferably has such a spring force that it can retract the lower portion 18 of the plate spring 15 by pulling said lower portion 18 upwards when said end portion 6 has been released, but the spring force is not so great that it substantially affects the exhaust pipe 3 in lateral direction upwards when the end portion 6 is in contact with the exhaust pipe 3.

The upper portion 17 preferably consists of two plate spring plates 24 and 25 which extend in parallel with each other. The spring plates 24, 25 are mounted on the bracket 19 such that a slit or gap 26 is defined therebetween, wherein the lower portion 18 of the plate spring 15 is displaceably engaged. This lower portion 18 may also consist of two plate spring plates 27 and 28 which preferably lie close to each other.

The spring element 21 preferably consists of a helical spring 29 which is threaded onto the plate spring 15 such that the helical spring 29 surrounds those portions of the plate spring 15 which protrude into each other. The upper and lower ends 22, 23 of the helical spring 29 can be hooked onto the plate spring 15 by extending through holes in the plate spring plates 24, 25 and 27, 28 respectively.

The support means 11 preferably includes or consists of a net 30 which is provided within the end portion 6 in such a way that said end portion 6 extend a distance in over the exhaust pipe 3 when the net 30 engage s the end edge 13 of the exhaust pipe 3.

The net 30 is preferably provided inside the inner end portion of a tubular end nozzle 31 of such an elastic material that is does not scratch or in any other way damage the vehicle 4 and/or its exhaust pipe 3. The net 30 is further preferably mounted such that it extends in parallel or substantially in parallel with the end edge 12 of the end portion 6. The tubular end nozzle 31 can be connected or attached to a tube member 32 of rigid material and the plate spring 15 can be attached to the tube member 32 through rivets or similar. The lower end of a hose member 33 forming part of the exhaust-gas extraction hose 1 can be threaded onto said tube member 32, and the upper end of the hose member 33 can be threaded onto the tubular member 16.

If the end nozzle 31 is of such elastic material, e.g. rubber material, having a large friction, it can be suitable to provide a smooth surface 31a having less friction than the rest of the end nozzle 31, or an element 31b, e.g. an arcuate piece of sheet having a smooth surface 31a, in those lower parts of the interior of the end nozzle that might engage the exhaust pipe 3. Hereby, the end nozzle 31 can more easily slide off the exhaust pipe 3 when this should happen.

Figure 2:
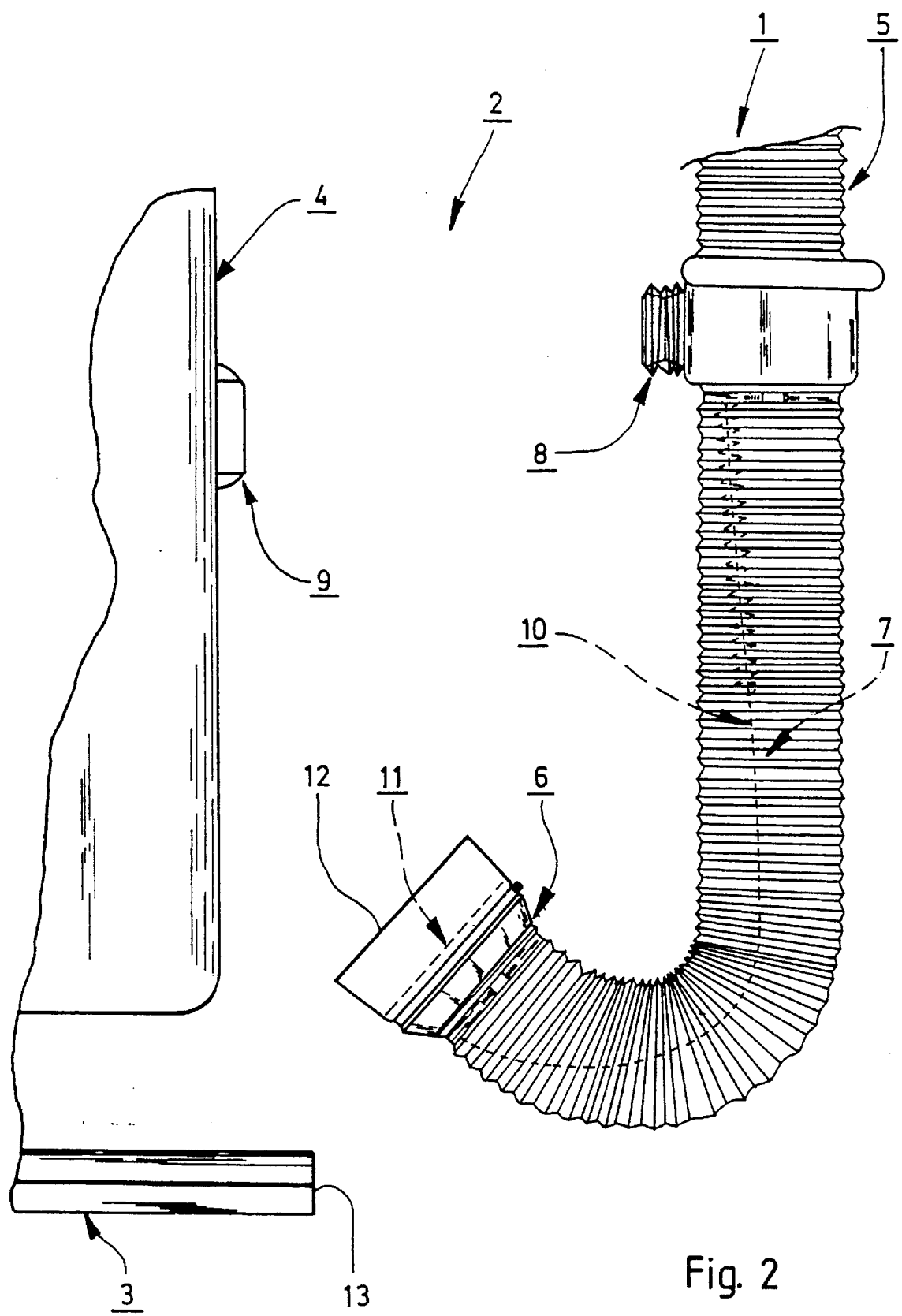
FIG. 2 is a side view of the hose in a disconnected position adjacent a vehicle to which said hose shall be connected for extracting exhausts from its exhaust pipe.
Figure 3:
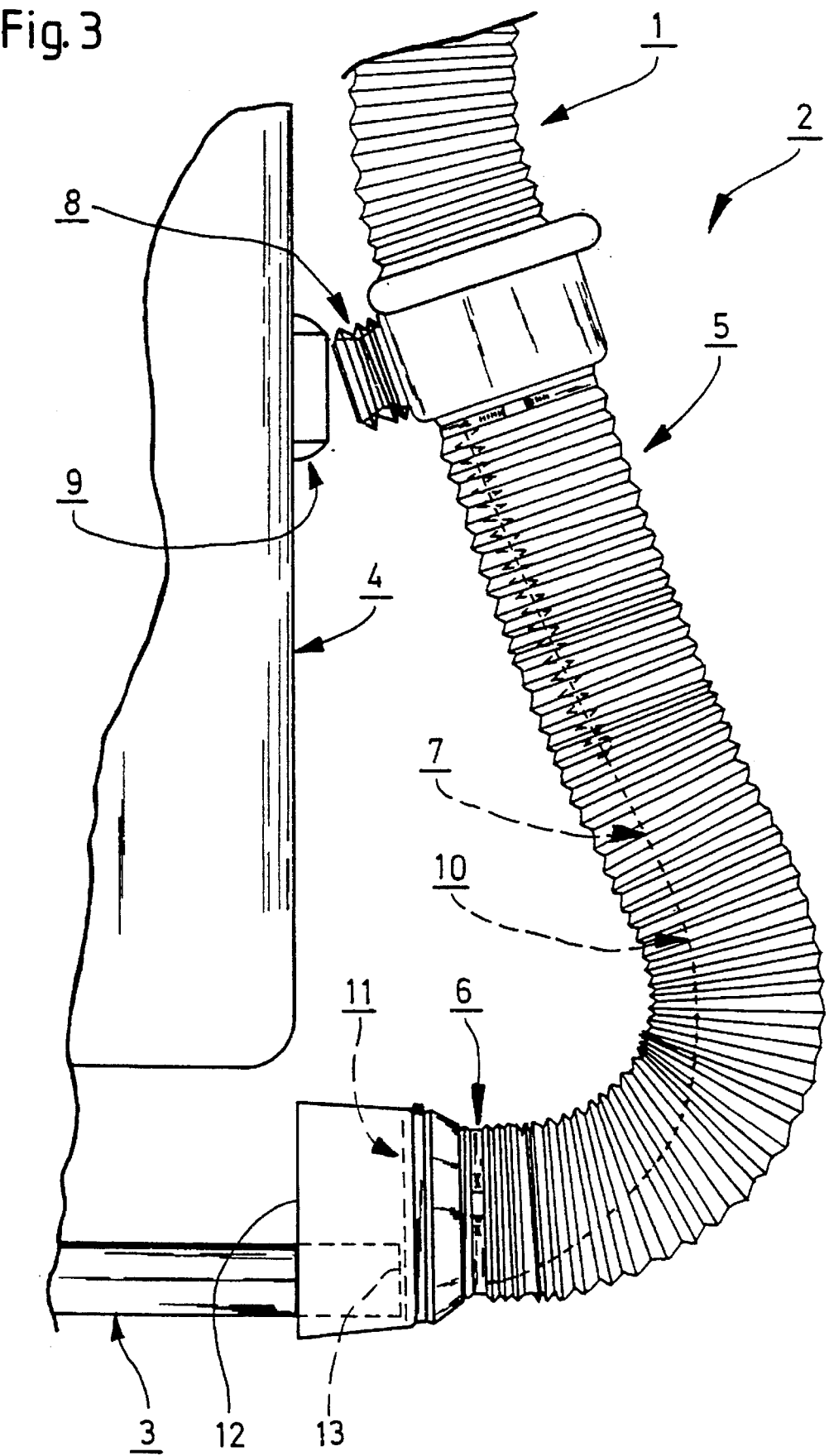
FIG. 3 is a side view of the hose during the coupling moment during which said hose is connected to the vehicle.
Figure 4:
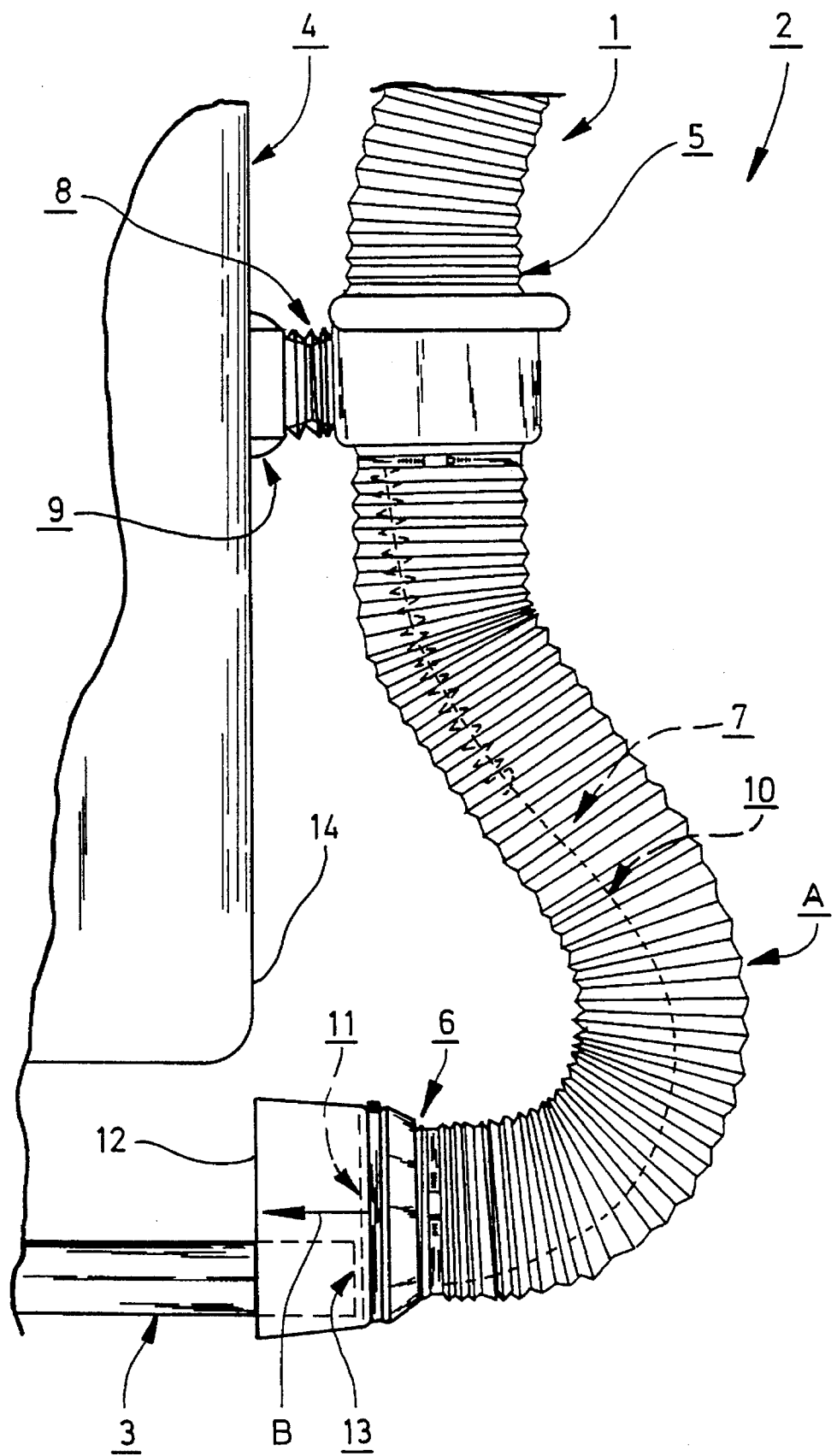
FIG. 4 is a side view of the hose when connected to the vehicle such that exhausts are extracted from the exhaust pipe of the vehicle through said hose.

Before the exhaust-gas extraction hose 1 is connected to the exhaust pipe 3 and/or vehicle 4, it is substantially in the position shown in FIG. 2. For connection, the end portion 6 is placed e.g. such that the support means 11 thereof engages the end edge 13 of the exhaust pipe 3 (see FIG. 3). Thereafter, the spring means 10 is bent until the retaining device 8 can be brought in contact with the fixing means 9 (FIG. 4), whereafter the retaining device 8 is locked or fixed to the fixing means 9 as defined above. Hereby, the spring means 10 has been stretched to S-shape or substantially S-shape such that it affects the end portion 6 in direction B towards the exhaust pipe 3 and retains the end portion 6 therein as long as the retaining device 8 is attached to the vehicle 4. When the retaining device 8 is released from the vehicle 4, the end portion 6 will also be released and the vehicle 4 can move free from the exhaust-gas extraction hose 1. Of course, it is also possible first to connect the retaining device 8 to the fixing means 9 and thereafter locate the end portion 6 at the exhaust pipe 3 instead of the other way round.

Figure 5:
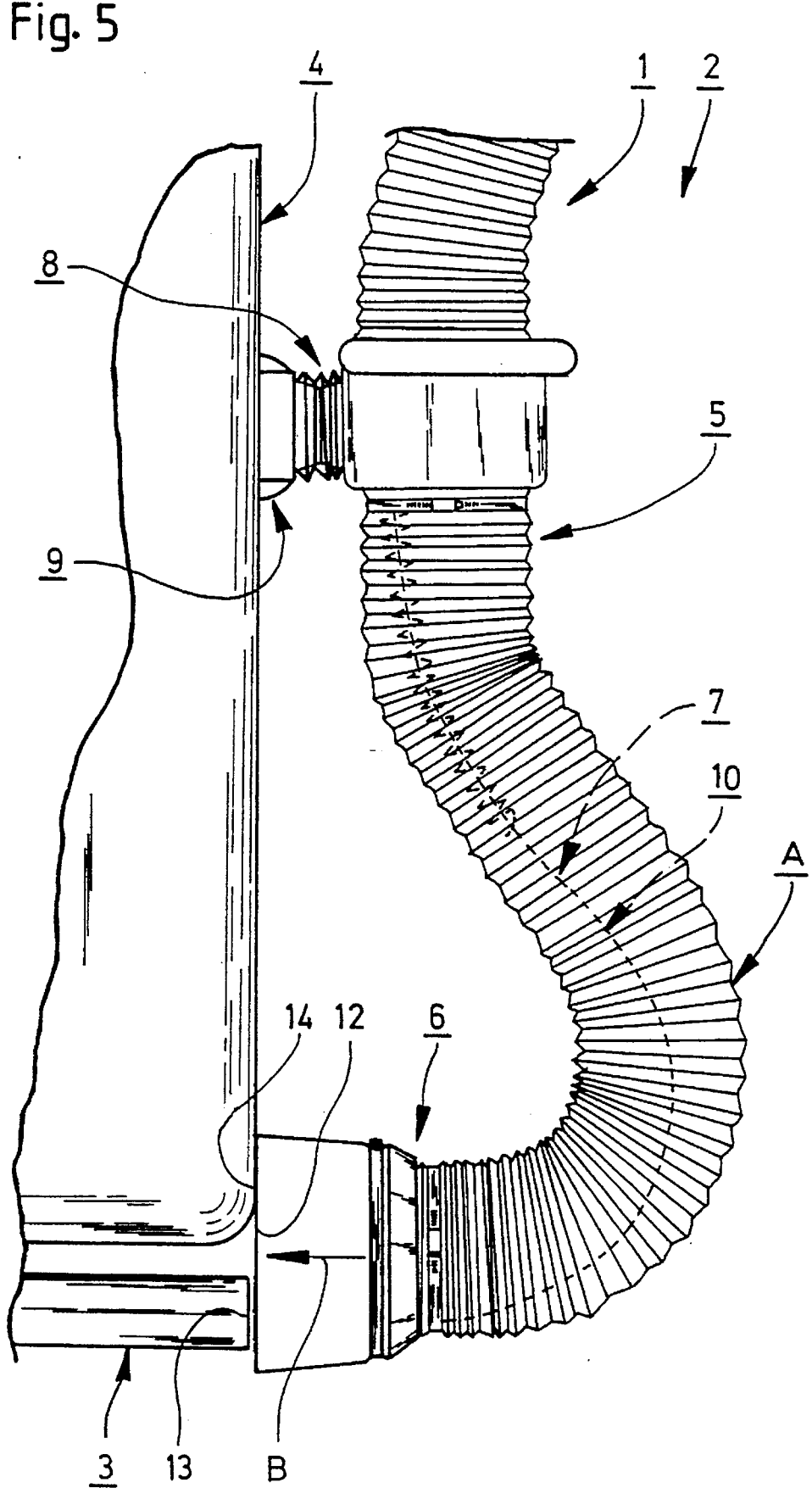
FIG. 5 is a side view of the hose when connected to the vehicle and such that exhausts can be extracted from the exhaust pipe of the vehicle but in a somewhat different manner than shown in FIG. 4.

If e.g. the exhaust pipe 3 is situated such that it is difficult to get at, the end portion 6 can instead be located with its end edge 12 engaging the vehicle 4 adjacent the end edge 13 of the exhaust pipe 3 in such manner that the exhausts from the exhaust pipe 3 still flow into the end portion 6 (see FIG. 5).

The invention is not limited to what is described above and shown in the drawings, but my vary within the scope of the following claims. Thus, the spring means 10 may be of another type than shown, there may be a plurality of such springs, the support means 11 may be of another type than shown and it can be located in another way than shown, the retaining device 8 may be of another type than shown and this is true also for e.g. the fixing means 9 and other necessary members for the operation of the invention.

I claim:

1. Device for exhaust-gas extraction hoses for extracting the exhaust from the exhaust pipe on a vehicle, comprising an exhaust-gas extraction hose (1) mounted at the top of a premises (2) and a depending part (5) thereof is located relative to the exhaust pipe (3) so that exhausts therefrom can be removed through the hose, whereby the exhaust-gas extraction hose (1) is adapted to be retained at the vehicle (4) in an exhaust-gas extracting position (A) when the vehicle is driven within the premises (2) whereby the exhaust-gas extraction hose (1) includes a retaining device (8) which can be located on the vehicle (4) spaced apart from the exhaust pipe (3), and whereby an end portion (6) of the exhaust-gas extraction hose (1) includes and cooperates with a tightening device (7) which can be tightened by bending or stretching the end portion (6) and which retains said end portion in an exhaust-gas extracting position (A) when the retaining device (8) is attached to the vehicle (4), characterized in that the tightening device (7) comprises at least one spring means (10) which can be stretched in such a way that said spring means, when the retaining device (8) is attached to the vehicle (4), biases the end portion (6) of the exhaust-gas extraction hose (1) in an horizontal direction or in a substantially horizontal direction such that the end portion (6), through a support means (11) mounted therein or through its end edge (12), is held with pressure against the end edge (13) of the exhaust pipe (3) or against vehicle parts (14) situated adjacent said end edge (13) of the exhaust pipe (3), wherein said spring means (10) is mounted inside the exhaust-gas extraction hose (1), that the spring means (10) is attached inside and to a tube member (32) of rigid material forming part of the end portion (6), and that the spring means (10) includes an upper end portion (20) which is rigidly connected to the retaining device (8).

2. Device according to claim 1 characterized in that the spring means (10) can be stretched by bending it from normal shape to an S-shape or substantially S-shape.

3. Device according to claim 1 characterized in that the spring means (10) is attached to the bottom surface of the tube member (32).

4. Device according to claim 1 characterized in that the spring means (10) includes at least one plate spring (15) which is connected at one end to a member (16) of the retaining device (8) provided on the exhaust-gas extraction hose (1) and is mounted on another end to the end portion (6) of the hose (1).

5. Device according to claim 4 characterized in that the plate spring (15) includes an upper portion (17) which in inoperative normal shape is straight or substantially straight and in an inoperative normal position directed vertically or substantially vertically, said plate spring (15) having a lower portion (18) which is arcuate or substantially arcuate and swung aside relative to the upper portion (17) in the same or substantially the same lateral direction as the retaining device (8) protrudes from the exhaust-gas extraction hose (1), said lower portion (18) of the spring (15) in inoperative normal position holds the end portion (6) of the hose (1) in an upwardly inclined direction.

6. Device according to claim 5, characterized in that the plate spring further includes a lower portion (18) which is telescopically movable in a vertical or substantially vertical direction relative to the upper portion (17) of said plate spring.

7. Device according to claim 6, characterized in that the upper and lower portions (17, 18) of the plate spring (15) guide each other such that the lower portion (18) is only movable linearly relative to the upper portion (17) and that at least one spring element (21) is provided to be stretched when said lower portion (18) of the plate spring (15) is affected in a downwards direction relative to said upper portion (17) of the plate spring, such that said lower portion (18) of said plate spring is automatically retracted in an upwards direction after having been pulled downwards relative to said upper portion (17), whereby the spring element (21) preferably has insufficient spring force in said stretched condition to subject said exhaust pipe to upwardly directed damaging loads when the end portion (6) is connected thereto.

8. Device according to claim 7, characterized in that the upper and lower portions (17, 18) of the plate spring (15) engage each other and are telescopically displaceable in relation to each other, and that the spring element (21) which is stretched when pulling down on the lower portion (18) of the plate spring (15) consists of a helical spring (29) that surrounds the engaged upper and lower portions (17, 18) of the plate spring (15), whereby the upper end portion (22) of the helical spring (29) is directly or indirectly connected to the upper portion (17) of the plate spring (15) and the lower end portion (23) of the helical spring (29) is connected to the lower portion (18) of the said plate spring.

9. Device according to claim 1 characterized in that the support means (11) comprises or consists of a net (30) which is provided inside the end portion (6) of the exhaust-gas extraction hose (1) such that said end portion (6) protrudes a distance over the exhaust pipe (3) when the net (30) engages the end edge (13) of said exhaust pipe.

10. Device according to claim 9, characterized in that the net (30) is provided at an inner end portion of a tubular end nozzle (31) of elastic material and that the net (30) extends in parallel or substantially in parallel with an end edge (12) of the end portion (6).

11. Device according to claim 1, whereby the end portion (6) of the exhaust-gas extraction hose (1) includes an end nozzle (31) of elastic material, characterized in that such lower portions of the interior of the end nozzle (31) which might engage the exhaust pipe (3) include a surface (31a) with less friction than the rest of the end nozzle (31), such that said end nozzle can more easily slide off the exhaust pipe (3) when the retaining device (8) is released from the vehicle (4).

12. Device according to claim 11, characterized in that the surface (31a) having less friction than the rest of the end nozzle (31) is defined by a piece of sheet (31b).

* * * * *